(No Model.)
J. W. NUNN.
HUB ATTACHING DEVICE.
No. 287,311.   Patented Oct. 23, 1883.
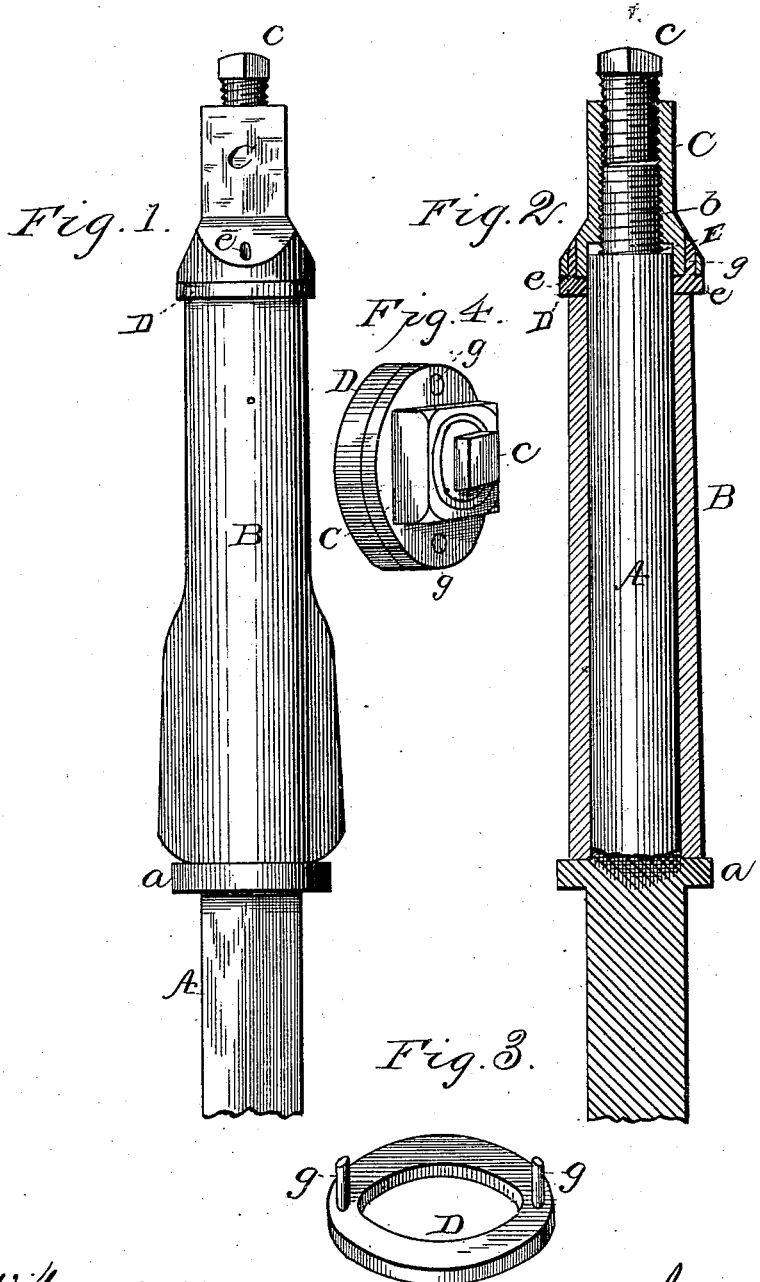
Witnesses:
J. W. Reynolds
Edward E. Ellis
Inventor
James W. Nunn
per
O. E. Duffy
Atty

UNITED STATES PATENT OFFICE.

JAMES W. NUNN, OF KINGSTREE, SOUTH CAROLINA, ASSIGNOR OF ONE-HALF TO EDWIN EPPS, OF SAME PLACE.

HUB-ATTACHING DEVICE.

SPECIFICATION forming part of Letters Patent No. 287,311, dated October 23, 1883.

Application filed May 22, 1883. (No model.)

*To all whom it may concern:*

Be it known that I, JAMES W. NUNN, of Kingstree, in the county of Williamsburg and State of South Carolina, have invented certain new and useful Improvements in Axle-Nuts; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

My invention has for its object to provide improved novel means whereby the wear and tear of the axle-boxes of carriage, wagon, and other vehicle-wheels can be compensated for; and to this end it consists in the combination of the axle arm and box of a vehicle-wheel with the tap or nut, washer, and screw-bolt, such as will be hereinafter more particularly described, and pointed out in the claim.

Referring to the drawings hereunto annexed, Figure 1 is a longitudinal view of an axle-box, showing portion of axle and embodying my improvements. Fig. 2 is a longitudinal sectional view of the same; Fig. 3, a top perspective view of the washer; and Fig. 4 is a perspective view of the nut, washer, and screw-bolt, as combined.

Reference being had to the letters marked thereon, A is the axle, provided with the usual circumferential flange, *a*, against which abuts the inner end of the axle-box B, both axle and box being of the ordinary tapering form. The outer end of the axle-arm is screw-threaded, as seen at *b*, on which is designed to be screwed the nut C, which nut is of equal bore, and of course screw-threaded. *c* is a screw-bolt, which is screwed in the nut after it is put on the axle, for the purpose hereinafter described. The nut, as shown in Figs. 1 and 2, is quite thick and of a conical form; but for general purposes I prefer using such a nut as shown in Fig. 4, although that shown in Fig. 2 will admit of compensation for a greater amount of wear on the end of the axle-box. In the base or flange of the nut are holes or slots *e e*, by which is fitted thereto the washer D, of smooth and equal bore, which is provided with corresponding lugs or pins, *g g*, which fit in said openings. The inner end of the nut is provided with a cylindrical chamber, E, which is large enough to be passed over the unthreaded portion of the axle when the nut is not limited in its movement by the adjustment of the screw-plug. With this construction the inner end of the nut may be made to bear against the end of the box by withdrawing the screw-plug and reinserting it after the nut has been screwed on until it comes in contact with the box. A slight adjustment of the plug and nut will be sufficient to take up wear from time to time. It will be seen that washers are not necessarily required where this improved nut is used. The nut, screw-bolt, and washer are preferably made of metal. As is well known, in axles of tapering form it is desired that the inner end of the box be kept as nearly against the usual flange, *a*, as possible, for the purpose of preventing the ingress of sand within the axle-box, which soon causes considerable wear, and in view of these facts it is necessary to compensate for said wear and tear of the box at either end in some manner, and by the use of the means employed by myself the operation will be as follows: The nut C is screwed onto the screw-threaded end of the axle-arm and turned thereon to abut against the outer end of the box sufficiently tight, and then the screw-bolt is screwed within the nut tight against the end of the axle, and, as will be evident, a tight locking of the nut to the axle is thus secured. Now, as the axle-box wears, to fasten it up tight again the screw-bolt is partly unscrewed and the nut screwed up to take up said wear, when the bolt is again screwed up tight against the end of the axle, as before. The washer need not be employed until the before-mentioned parts have become extremely worn.

It will be seen that by my invention the great labor of supplying this defect by washers is avoided; and it will also be seen that the wheels can always be prevented from lateral or sidewise movement by simply tightening the nut, as explained. The said nut may be made of different sizes, to fit the various axles.

Having thus described my invention, what I claim is—

An improvement in hub-attaching devices for vehicle-axles, consisting of the nut having enlarged base, provided with holes $e$, and within which base is formed the chamber E, in combination with the washer D, having smooth and equal bore, and provided with pins $g$ and the set-screw plug, substantially as described.

In testimony that I claim the foregoing as my own I affix my signature in presence of two witnesses.

JAMES W. NUNN.

Witnesses:
 B. F. MORSELL,
 EDWARD E. ELLIS.